(No Model.) 2 Sheets—Sheet 1.

J. S. SMITH.
ELASTIC TIRE.

No. 476,085. Patented May 31, 1892.

Witnesses. Inventor.

(No Model.)  2 Sheets—Sheet 2.

J. S. SMITH.
ELASTIC TIRE.

No. 476,085. Patented May 31, 1892.

Witnesses.

Inventor.
John Samuel Smith.
By
John J. Halsted & Son
his atty's

UNITED STATES PATENT OFFICE.

JOHN SAMUEL SMITH, OF LONDON, ENGLAND.

ELASTIC TIRE.

SPECIFICATION forming part of Letters Patent No. 476,085, dated May 31, 1892.

Application filed March 10, 1891. Serial No. 384,515. (No model.)

*To all whom it may concern:*

Be it known that I, JOHN SAMUEL SMITH, a subject of the Queen of Great Britain, residing at London, England, have invented new and useful Improvements in Elastic Tires, of which the following is a specification.

This invention relates to improvements in that class of wheel-tires which are formed hollow and inflated with air or other fluid, the object of my improvements being to obtain greater strength than heretofore and to provide simple means for allowing the tire to be removed for repairs.

According to my invention the tube to be inflated has placed around it a covering of leather and india-rubber, the edges of this covering (which form flaps) being laced together to attach the tire to the rim.

To enable my invention to be fully understood, I will describe the same with reference to the accompanying drawings, in which—

Figure 1:
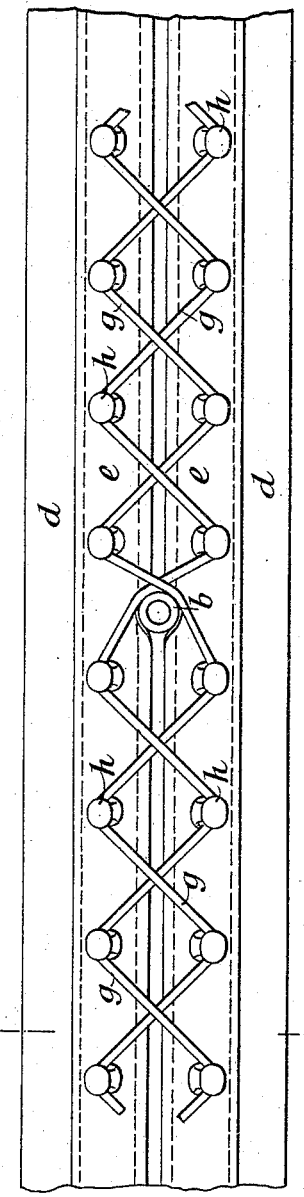
Figure 2:
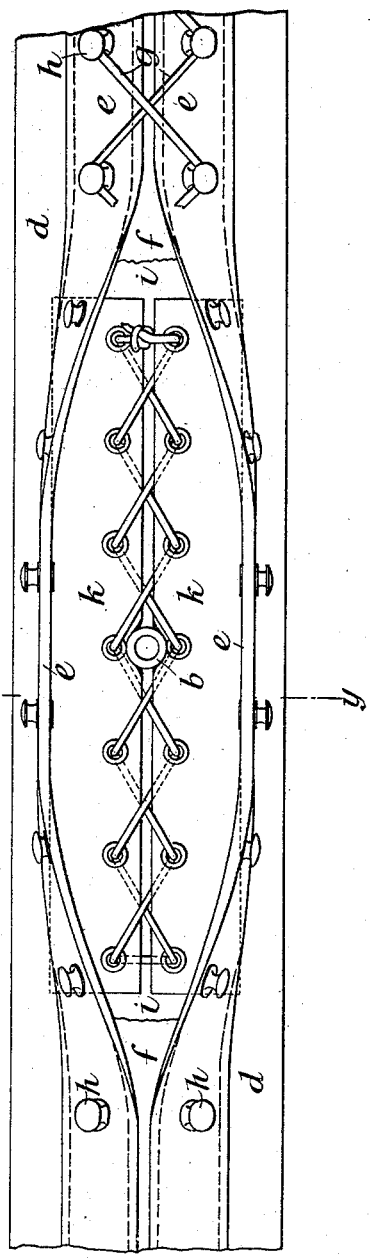
Figure 4:
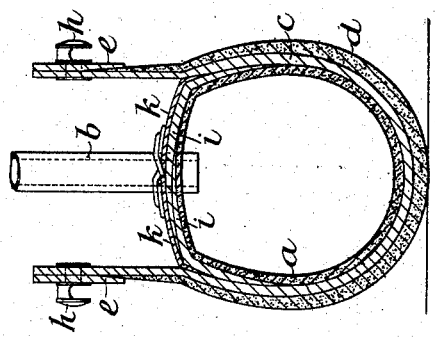
Figure 5:
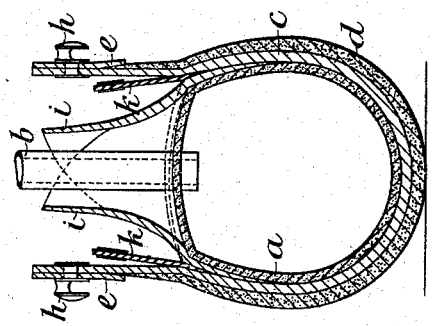
Figure 3:
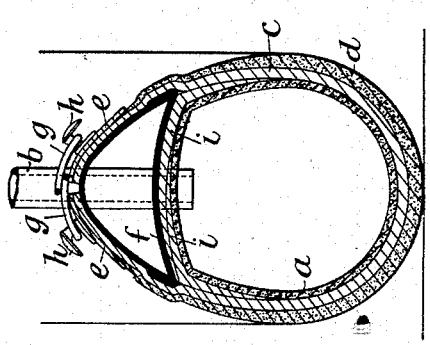

Figure 1 is a view of the inner or under side of a portion of the rim of a wheel provided with my improved tire, and Fig. 2 is a similar view representing the lacing-flaps thrown back and part of the metal rim broken away. Fig. 3 is a section on the line $x\,x$, Fig. 1; and Fig. 4 is a section on the line $y\,y$, Fig. 2. Fig. 5 is a view similar to Fig. 4, but showing some of the parts in different positions.

$a$ indicates the inflatable tube of the tire, and $b$ the pipe through which the inflation is effected, the said pipe being provided with a suitable valve in a well-known manner.

$c\,d$ indicate the leather and india-rubber, respectively, of the covering by which the said tube is surrounded, that portion of the india-rubber which comes in contact with the ground being thicker than the other parts thereof, as shown clearly in the drawings. $e\,e$ are the edges of the said covering, the said edges forming flaps which, when the tire is placed against the rim of the wheel, (which rim in the drawings is indicated by the letter $f$,) can be secured by means of a lace $g$, connected to stud-hooks or eyelets $h\,h$ on the edges of the said flaps.

In order that the tube $a$ shall not come into immediate contact with the rim $f$, whereby the said tube would be liable to injury, I secure lappets or flaps $i\,i$ to the leather portion $c$ of the covering by stitching otherwise, as shown most clearly in Fig. 3. In practice I find it advantageous to cement a strip of canvas or the like on the lappets to support the stitching. These lappets, which lie one upon the other, are advantageously cemented together, so that they will tend to counteract to a certain extent any lateral expansion of the said tube. In order, however, that the tube may be introduced into and removed from the covering, it is necessary to provide openings at one or more points, and therefore at such points the said lappets $i\,i$ are left uncemented, so that they can be turned back, as shown in Fig. 5, to allow the withdrawal of the tube. To hold these uncemented lappets in position, I advantageously provide the auxiliary flaps $k\,k$, adapted to be laced together, as shown most clearly in Figs. 2 and 4. If desired, the lappets $i\,i$ may be left entirely uncemented—that is to say, they may be adapted to open at any point, and in such case the auxiliary flaps $k$ must extend entirely around the tire.

Having now particularly described and ascertained the nature of my said invention and in what manner the same is to be performed, I declare that what I claim is—

1. The combination, with an inflated tube and a covering for the same, of auxiliary laced lappets applied as described, and for the purpose set forth.

2. An elastic tire comprising an inner tube capable of being inflated and a covering for the same, the edges of which form flaps for enabling the tire to be secured to the rim of the wheel by means of laces, a protecting-layer being arranged between the inflated tube and the rim of the wheel, the said layer being formed of two lappets which can be wholly or partially turned back to allow the withdrawal of the inflated tube from the covering and which, where adapted to be thrown back, are held by auxiliary laced flaps, substantially as described.

JOHN SAMUEL SMITH.

Witnesses:
  G. F. REDFERN,
  JOHN E. BOUSFIELD,
*Of the firm of G. F. Redfern & Co., 4 South Street, Finsbury, London, Patent Agents.*